United States Patent [19]

Pottebaum

[11] Patent Number: 5,777,821
[45] Date of Patent: Jul. 7, 1998

[54] LOW SWAY SPACE CHASSIS FOR A DISC DRIVE HAVING A VIBRO-ACOUSTIC ISOLATOR

[75] Inventor: Kenneth L. Pottebaum, Yukon, Okla.

[73] Assignee: Seagate Technology, Inc., Scotts Valley, Calif.

[21] Appl. No.: 671,704

[22] Filed: Jun. 28, 1996

[51] Int. Cl.$^6$ ................................................. G11B 33/08
[52] U.S. Cl. ................................................. 360/97.02
[58] Field of Search ........................... 360/97.01, 97.02, 360/98.01, 97.03; 369/263; 310/51, 67 R, 90–91; 361/683–685

[56] References Cited

U.S. PATENT DOCUMENTS

| | | |
|---|---|---|
| 4,491,888 | 1/1985 | Brown et al. |
| 5,140,478 | 8/1992 | Yoshida ................ 360/97.01 |
| 5,214,549 | 5/1993 | Baker et al. ........... 360/97.02 |
| 5,235,482 | 8/1993 | Schmitz ................ 360/97.02 |
| 5,483,397 | 1/1996 | Gifford et al. ........ 360/97.02 |

Primary Examiner—Stuart S. Levy
Assistant Examiner—George J. Letscher
Attorney, Agent, or Firm—Bill D. McCarthy; Edward P. Heller, III; Randall K. McCarthy

[57] ABSTRACT

A low sway space disc drive assembly having a base deck with a base portion and side walls extending therefrom. A top cover mates with the side walls to form an internally sealed environment for the disc drive. An external chassis is mounted to the underside of the base portion of the base deck and a vibro-acoustic isolator is disposed between the external chassis and the base portion, the isolator and the chassis providing mechanical isolation for the drive from internal and external vibrations as well as strengthening the base deck. The chassis includes flanges which strengthen the chassis and accommodate a printed circuit board attached to the base deck, the printed circuit board providing the control electronics for the drive. The flanges further include threaded holes for attachment of the chassis to a user environment.

12 Claims, 4 Drawing Sheets

LOW SWAY SPACE CHASSIS FOR A DISC DRIVE HAVING A VIBRO-ACOUSTIC ISOLATOR

CROSS REFERENCE TO RELATED APPLICATION

This application claims priority to Provisional Application Serial No. 60/008,805 filed Dec. 14, 1995, hereby incorporated by reference.

BACKGROUND OF THE INVENTION

1. Field of the Invention

This invention relates generally to the field of disc drive data storage devices, and more particularly, but not by way of limitation, to a low sway space chassis configuration in a disc drive.

2. Discussion

Disc drives are commonly used in workstations, personal computers, portables and other computer systems to store large amounts of data in a form that can be made readily available to a user. In general, a disc drive comprises one or more magnetic discs that are rotated by a spindle motor at a constant high speed. The surface of each disc is divided into a series of data tracks which are spaced radially from one another across a band having an inner diameter and an outer diameter. The data tracks extend circumferentially around the discs and store data in the form of magnetic flux transitions within the radial extent of the tracks on the disc surfaces. Typically, each data track is divided into a number of data sectors that store fixed sized data blocks.

A head includes an interactive element such as a magnetic transducer which senses the magnetic transitions on a selected data track to read the data stored on the track, or to transmit an electrical signal that induces magnetic transitions on the selected data track to write data to the track. The head includes a read/write gap that positions the active elements of the head at a position suitable for interaction with the magnetic transitions on the data tracks of a disc as the disc rotates.

As is known in the art, each head is mounted to a rotary actuator arm and is selectively positionable by the actuator arm over a preselected data track of the disc to either read data from or write data to the preselected data track. The head includes a slider assembly having an air bearing surface that causes the head to fly over the data tracks of the disc surface due to fluid air currents caused by rotation of the disc.

Typically, several discs are stacked on top of each other and the surfaces of the stacked discs are accessed by the heads mounted on a complementary stack of actuator arms which comprise an actuator assembly, or "E-block". The E-block generally includes head wires which conduct electrical signals from the heads to a flex circuit, which in turn conducts the electrical signals to a printed circuit board (PCB) mounted to a disc drive base deck.

A trend in the industry is to continue to increase the capacities of modern disc drives while maintaining or reducing the physical sizes of the drives. As a result, disc drives are becoming increasingly sensitive to external vibration inputs, self-excitation of rigid body vibration modes and warpage when mounted in fixtures or systems.

Generally, previous generations of disc drives were relatively less sensitive to such factors because these designs typically included vibration isolation devices (normally referred to as "shock mounts") within the disc drive housing structure. As will be recognized, these shock mounts provided vibration isolation for selected frequencies and additionally protected disc drive base decks from warpage. Also, previous generations of drives had lower track densities, making them generally less sensitive to these factors.

However, the disadvantages from the use of shock mounts included a degradation in mechanical shock resistance of the drives, as well as requirements for significant amounts of sway space (that is, the space allocated to allow movement of a disc drive housing in the event of a mechanical shock to the drive). As will be recognized by those skilled in the art, the sway space requirement significantly affects the design of a drive because the disc drive space "envelope" includes not only the physical space occupied by the drive, but also the associated sway space requirement of the drive. Thus, both the physical size of the drive as well as the associated sway space must fit within the available space for the drive in a given application (such as, for example, within a disc drive bay in a PC).

The shock mounts used in previous generations of disc drives were typically either grommet or sandwich mounts, comprising an elastomeric material which isolated a disc drive mounting fixture from the drive housing. As will be recognized, the sway space requirement for a drive utilizing shock mounts generally depends upon the shock mount system resonant frequencies and the non-operating shock requirements of the drive. As the capacities, seek rates and shock performance levels of disc drives have been continually raised, sway space requirements have been a significant factor influencing the migration away from the use of shock mounts in modern drive designs.

There is a need, therefore, for an improved disc drive design that protects the drive from warpage and isolates the drive from internal vibrations and external non-operating shocks, while at the same time providing the advantage of low sway space requirement.

SUMMARY OF THE INVENTION

The present invention comprises a low sway space disc drive assembly with an external chassis and vibro-acoustic isolator which strengthen the disc drive and isolate the disc drive from the effects of internal and external vibrations.

The disc drive includes a base deck having a base portion and sidewalls extending from the base portion, the base portion having an interior surface and an exterior surface, wherein a disc assembly and an actuator are mounted to the interior surface of the base portion. A top cover mates with the side walls to form an internally sealed environment for the disc assembly and the actuator.

A chassis is mounted to the exterior surface of the base portion, the chassis having inwardly directed printed circuit board flanges which strengthen the chassis and accommodate a printed circuit board. The flanges further include threaded holes which are used to provide mechanical attachment of the chassis to user environment (such as a disc drive bay in a PC). A vibro-acoustic isolator is disposed between the chassis and the exterior surface of the base portion to isolate the disc drive from the user environment.

In one preferred embodiment, the chassis comprises a c-shaped member comprising a chassis base portion substantially the same shape as the base portion of the base deck, the flanges extend from selected edges of the chassis base portion, and the chassis base portion is proximately aligned with and secured to the base portion of the base deck with the isolator disposed therebetween.

In another preferred embodiment, the chassis comprises a pair of rails, with each rail including a vertical portion aligned with and secured to a selected surface of the side wall of the base deck and a base deck flange extending from the vertical portion. Each base deck flange is proximately aligned with the base portion of the base deck with the isolator disposed therebetween and a channel is formed between each base deck flange and each printed circuit board flange so that the channel accommodates a portion of the printed circuit board.

An object of the present invention is to provide a low sway space disc drive assembly.

Another object is to limit the deflection of the disc drive assembly during installation or as a result of other shock conditions.

Still another object is to isolate the disc drive assembly from the effects of internal and external vibrations.

Yet another object is to reduce acoustic emissions from the disc drive.

Other objects, advantages and features of the present invention will be apparent from the following description when read in conjunction with the drawings and appended claims.

BRIEF DESCRIPTION OF THE DRAWINGS

FIG. 5 is an isometric, exploded view of the two-piece chassis of the present invention.

FIG. 6 is an end, elevational view of the two-piece chassis of FIG. 4 in conjunction with a disc drive similar to the disc drive of FIG. 1.

DETAILED DESCRIPTION OF THE PREFERRED EMBODIMENT

Figure 1:
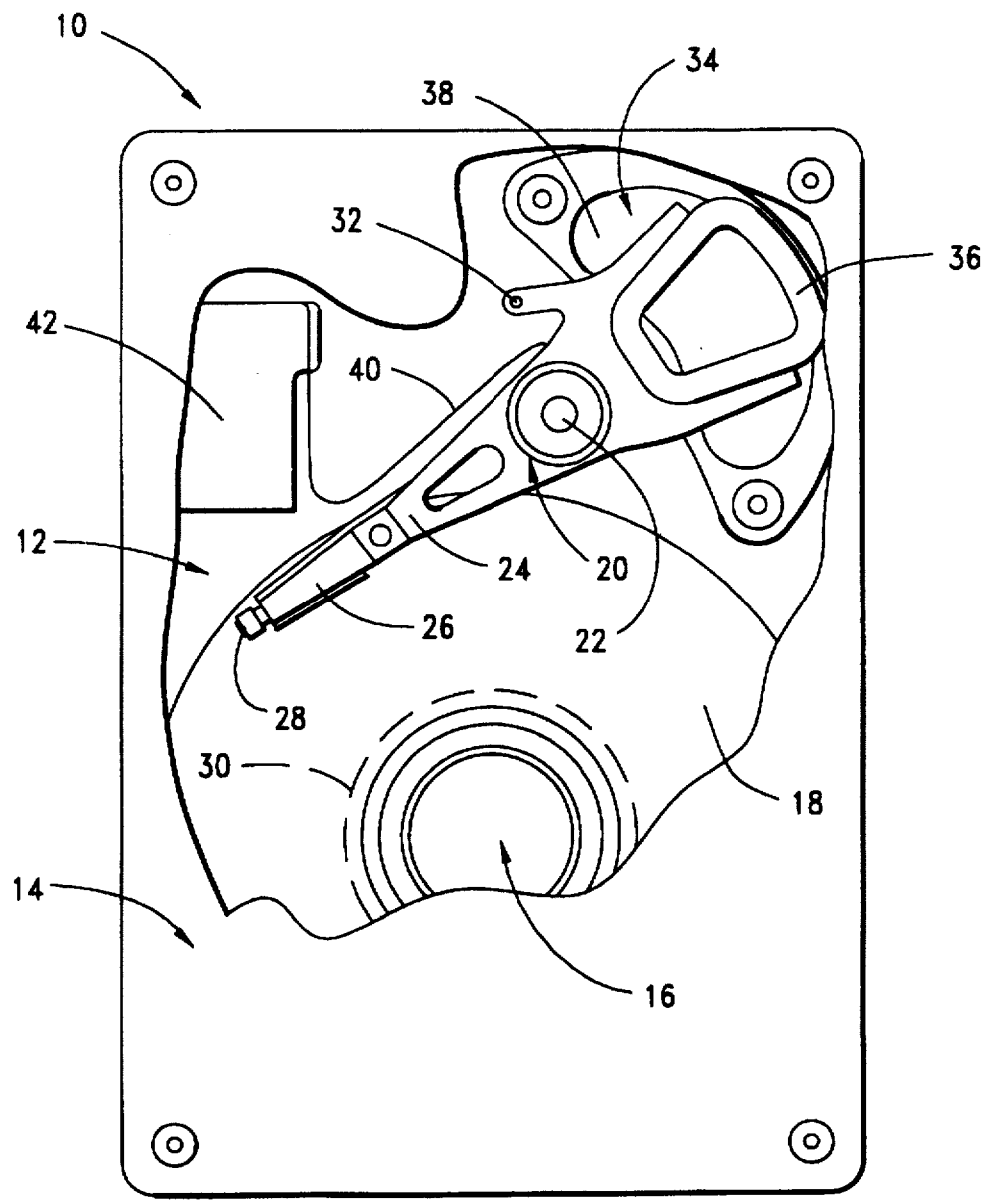
FIG. 1 is a top plan view of a disc drive in which the present invention is particularly useful.

Turning now to the drawings and more particularly to FIG. 1, shown therein is a top plan view of a disc drive 10 in which the present invention is particularly useful. The disc drive 10 includes a base deck 12 to which various disc drive components are mounted and a top cover 14, which is shown in a partial cut-away fashion to expose selected components of interest. Although not explicitly illustrated in the top plan view of FIG. 1, it will be readily understood that the base deck 12 includes an interior surface to which various disc drive components are mounted, as well as side walls which, in combination with the top cover 14, provide sufficient height to house these components within a sealed internal environment.

Mounted to the base deck 12 is a spindle motor (shown generally at 16) to which a plurality of discs 18 are mounted for rotation at a constant high speed. Adjacent the discs 18 is an actuator assembly 20 (hereinafter sometimes also referred to as an "E-block") which pivots about a pivot shaft 22 in a rotary fashion. The E-block 20 includes actuator arms 24 which support gimbal assemblies 26 (hereinafter also sometimes referred to as "load springs"). The load springs 26 in turn support heads 28, with each of the heads 28 corresponding to a surface of one of the discs 18. As provided hereinabove, the heads 28 are positionably located over data tracks (not shown) of the discs 18 in order to read data from and write data to the tracks, respectively. At such time that the disc drive 10 is not in use, the heads 28 are moved to landing zones (denoted at broken line 30), which are located in FIG. 1 near the inner diameter of the discs 18.

It will be recognized that the E-block 20 is provided with a latching arrangement (shown generally at 32) to secure the E-block 20 when the disc drive 10 is not in use. For a general discussion of typical E-block latching arrangements, see U.S. Pat. No. 5,231,556 entitled SELF-HOLDING LATCH ASSEMBLY, issued Jul. 27, 1993 to Blanks, assigned to the assignee of the present invention and incorporated herein by reference.

Continuing with FIG. 1, the E-block 20 is controllably positioned by way of a voice coil motor (VCM, shown generally at 34), comprising an actuator coil 36 immersed in the magnetic field generated by a permanent magnet 38. It will be recognized that a magnetically permeably flux path (such as a steel plate) is mounted above the actuator coil 36 to complete the magnetic circuit of the VCM 34, but for purposes of illustration this flux path has not been shown in FIG. 1. When controlled DC current is passed through the actuator coil 36, an electromagnetic field is set up which interacts with the magnetic circuit of the VCM 34 to cause the actuator coil 36 to move relative to the permanent magnet 38 in accordance with the well-known Lorentz relationship. As the actuator coil 36 moves, the E-block 20 pivots about the pivot shaft 22, causing the heads 28 to move across the surfaces of the discs 18.

To provide the requisite electrical conduction paths between the heads 28 and disc drive read/write circuitry (not shown), head wires (not separately shown) are routed on the E-block 20 from the heads 28, along the gimbal assemblies 26 and the actuator arms 24, to a flex circuit assembly 40. The head wires are secured (by way of suitable soldering process) to corresponding pads (not separately designated in FIG. 1) of the flex circuit assembly 40. In turn, the flex circuit assembly 40 is connected to a flex circuit bracket (shown generally at 42) in a conventional manner and communication is provided between the flex circuit bracket 42 and a printed circuit board (PCB) mounted to the underside of the disc drive 10 (the PCB is not shown in FIG. 1).

Figure 2:
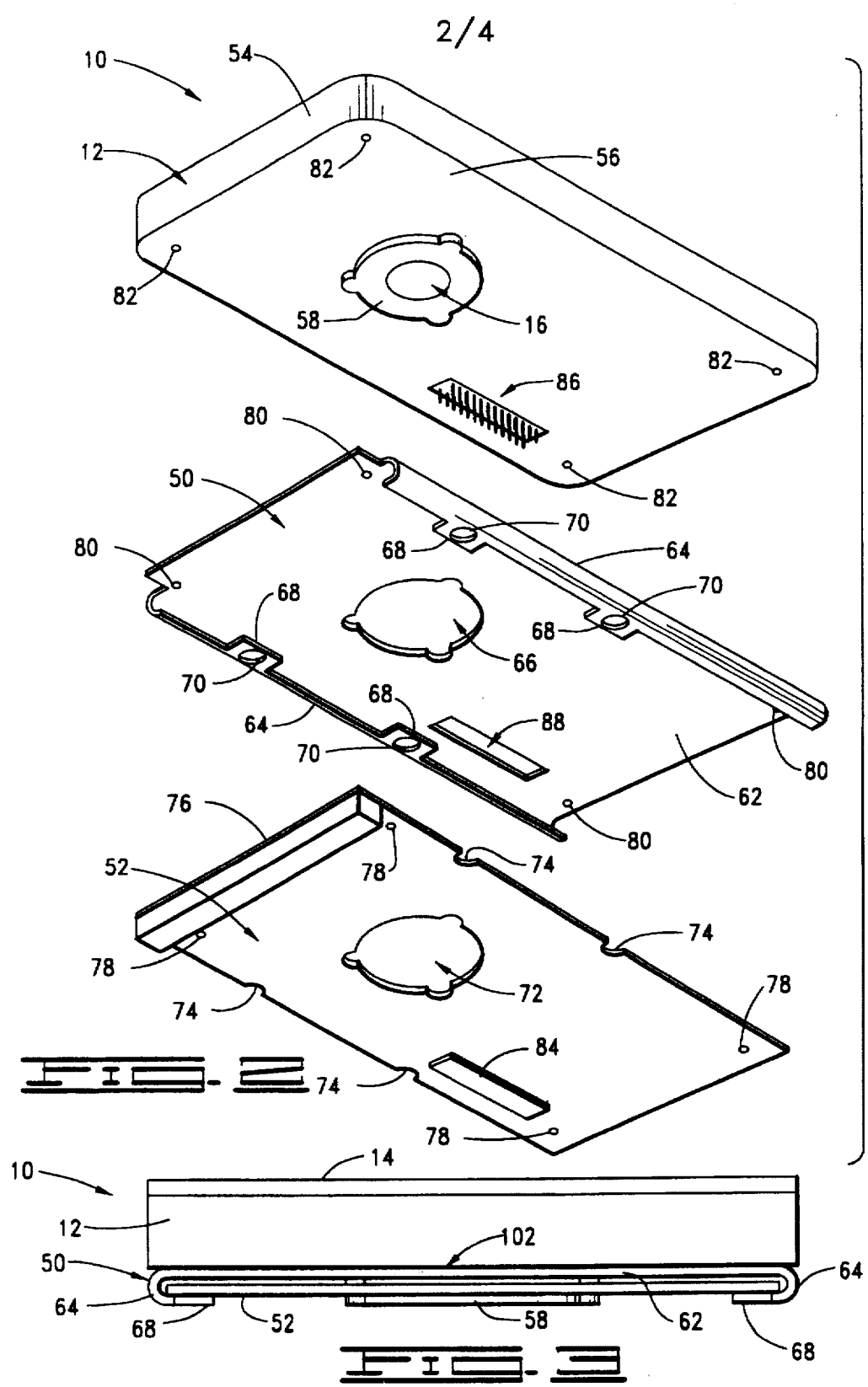
FIG. 2 is an isometric, exploded view of the one-piece chassis of the present invention.

Referring now to FIG. 2, shown therein is an isometric, exploded view of a low sway space, one-piece chassis 50 (hereinafter also referred to as "chassis 50") in conjunction with the base deck 12 and the PCB (designated therein at 52) of the disc drive 10 of FIG. 1. The chassis 50 is mounted to the base deck 12 in a manner to be described hereinbelow and the PCB 52, in turn, is mounted to the chassis 50. Selected features of each of these components will now be described.

Beginning with the base deck 12, as shown in FIG. 2 the base deck 12 includes side walls 54 and a base portion 56, with the cover 14 (shown in FIG. 1) engageable with the top of the side walls 54 in a conventional manner. Additionally, the side walls 54 substantially provide the interior height of the sealed environment for the disc drive 10. As will be recognized, the base deck 12 is preferably fabricated using a suitable casting process with secondary machining operations on selected surfaces as required.

The base portion 56 of the base deck 12 includes a spindle motor boss 58, which extends from the base portion 56 to accommodate selected internal components of the spindle motor 16. It will be recognized that the base portion 56 can be provided with additional features, such as configured portions having slightly different elevations to accommodate the components internal to the disc drive 10; however, for clarity of illustration, such features have not been included in FIG. 2.

Next, as shown in FIG. 2 the chassis 50 comprises a chassis base portion 62 having substantially the same size and shape as the base portion 56 of the base deck 12. Additionally, curved flanges 64 are provided along selected edges of the chassis base portion 62. The curved flanges 64 define generally U-shaped channels which enhance the strength of the chassis 50 along the length of the chassis 50. Further, as described below, the curved flanges 64 provide a C-shaped slot to accommodate the PCB 52. Inwardly directed tabs 68 extend from the curved flanges 64 to accommodate tapped holes 70, which extend through the curved flanges 64 and the tabs 68 as shown. The tapped holes 70 facilitate mechanical attachment of the disc drive 10 to a user environment (such as a disc drive bay in a PC) by way of threaded fasteners (not shown). The configuration of the tabs 68 and the holes 70 will be discussed in greater detail hereinbelow; generally, however, it will be recognized that the disc drive 10 is mounted to the user environment by way of the chassis 50.

The chassis base portion 62 is further shown in FIG. 2 to include a central opening 66 sized to accommodate the boss 58 of the base deck 12.

Finally, the PCB 52 houses electronic components (not shown) used by the disc drive 10. As with the chassis 50, the PCB 52 includes a central opening 72 sized to accommodate the boss 58 of the base deck 12. Additionally, notches 74 are provided on the edges of the PCB 52 as shown to accommodate the hardware (not shown) used to secure the chassis 50 to the user environment.

A PCB external connector 76 is provided at one end of the PCB 52, in order to provide power and communication connections from a host system (not shown) to the disc drive 10. PCB mounting holes 78 are provided through which hardware (not shown) is inserted to mount the PCB 52 to the base deck 12 (by way of through-holes 80 in the chassis 50 and threaded holes 82 in the base deck 12). Additionally, a PCB internal connector (the bottom of which is shown at 84) mates with connector pins 86 from the base portion 56 of the base deck 12 to make the necessary electrical interconnections between the PCB 52 and the components housed within the base deck 12. A corresponding connector opening 88 is provided in the chassis 50 to accommodate the connector 84 and the connector pins 86.

Figure 3:
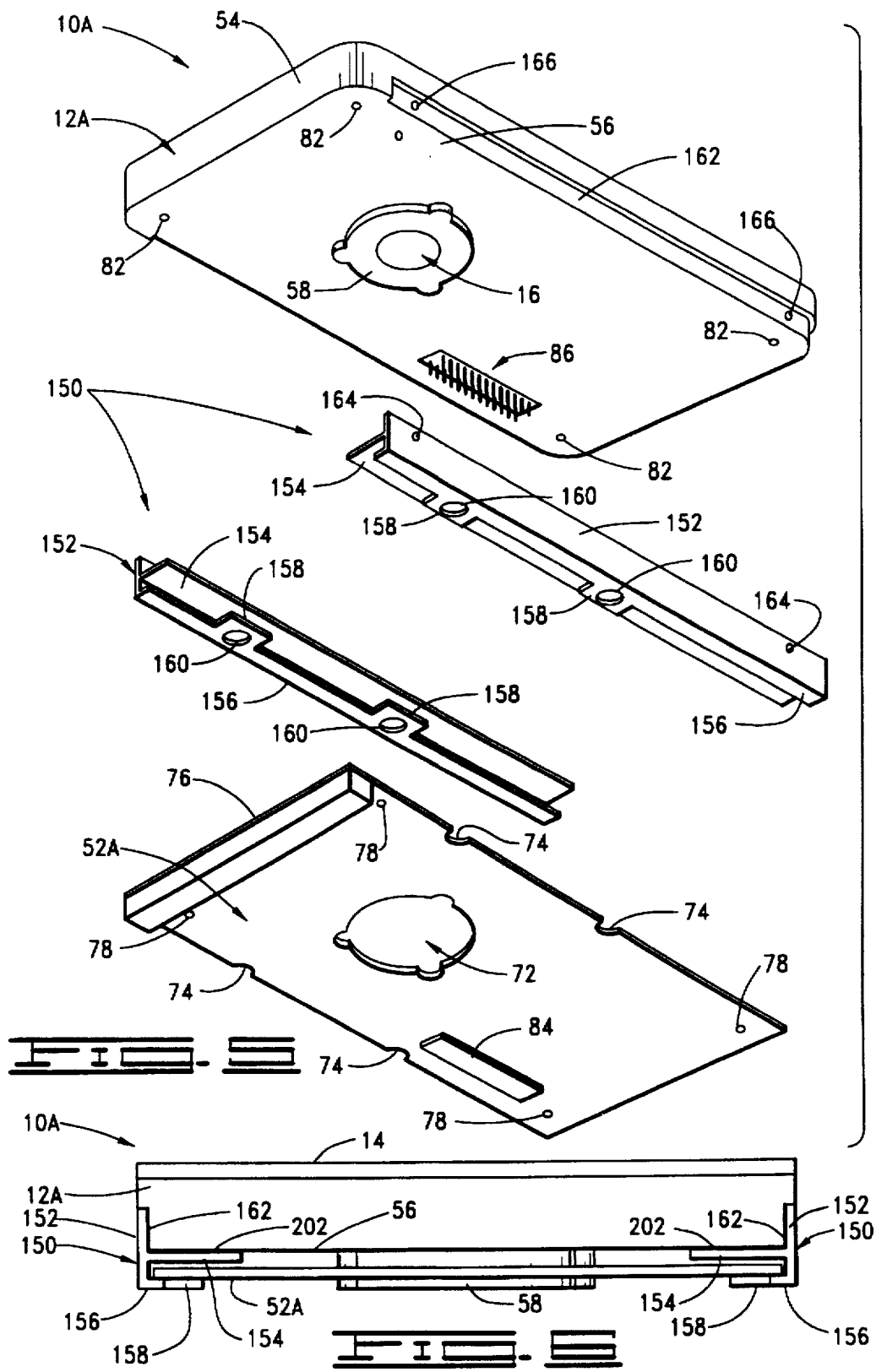
FIG. 3 is an end, elevational view of the one-piece chassis of FIG. 2 in conjunction with the disc drive of FIG. 1.

Having concluded a description of the respective features of the base deck 12, the chassis 50 and the PCB 52 of FIG. 2, the manner in which these components are integrated will now be discussed, with reference to FIGS. 2 and 3. For reference, FIG. 3 provides an elevational end view of the disc drive 10 of FIG. 1. More particularly, FIG. 3 shows the base deck 12 with the top cover 14 attached thereto, as well as the chassis 50 and the PCB 52. For purposes of clarity, the connector pins 86 of the base deck 12 and the connectors 76, 84 of the PCB 52 have been omitted from FIG. 3.

As shown in FIG. 3, disposed between the chassis 50 and the base deck 12 is a vibro-acoustic isolator 102, comprising a thin layer of damping material substantially conforming to the surfaces of the base portion 56 of the base deck 12 and the chassis base portion 62 of the chassis 50. The isolator 102, in conjunction with the chassis 50, operates to isolate the disc drive 10 from high frequency external vibrations.

Additionally, the isolator 102 and the chassis 50 provides constraint layer damping, reducing internal vibrations generated by the disc drive 10 as well as reducing acoustic emissions from the disc drive 10. Further, the isolator 102 and the chassis 50 will operate to generally resist warping of the base deck 12 when the disc drive 10 is mounted into a system.

The isolator 102 preferably comprises a layer of pressure sensitive adhesive (PSA) from about 0.025 to 0.25 millimeters (0.001 to 0.010 inches) thick. However, non-adhesive materials having appropriate damping properties, such as rubber or plastic, may also be used in place of PSA.

During assembly, the PCB 52 is mated with the chassis 50 by inserting the end of the PCB 52 opposite the connector 76 into the C-shaped slot defined by the chassis 50 and sliding the PCB 52 down the slot until the PCB 52 is aligned with the chassis 50. It will be recognized from FIG. 2 that the flanges 64 do not extend the full length of the chassis 50, in order to accommodate the connector 76 of the PCB 52.

The isolator 102 is applied to the base portion 56 of the base deck 12 and the assembled chassis 50 and PCB 52 is subsequently mounted to the base portion 56, "sandwiching" the isolator 102. The PCB 52 is then secured as provided hereinabove to the base deck 12 by way of PCB fasteners (not shown) and holes 78, 80 and 82. Suitable spacers (not shown) can be readily used with the fasteners to secure the chassis 50 to the base deck 12 and maintain the desired relative spacing, as shown in FIG. 3. Alternatively, suitable bosses (not shown) can be cast into the base deck 12.

Additionally, the PCB 52 can be sized and shaped as desired to allow the chassis 50 to be attached to the base deck 12 before attachment of the PCB 52. In such a case, the PCB 52 can be subsequently removed (such as during manufacturing) without necessitating the removal of the chassis 50.

It will be recognized that the use of PSA as the isolator 102 will generally operate to additionally secure the chassis 50 to the base deck 12, although subsequent removal of the chassis 50 from the base deck 12 (such as during manufacturing repair operations) with the use of double-sided PSA will generally be time consuming and necessitate destruction and replacement of the PSA. However, single-sided PSA could readily be used instead of double-sided PSA, in which case the single-sided PSA would be attached to either one of the base deck 12 or the chassis 50, thereby facilitating subsequent disengagement of the chassis 50 from the base deck 12. Further, additional mechanical locking arrangements (such as additional holes in the chassis 50 and the base deck 12 and associated hardware, not shown) could readily be utilized to further secure the chassis 50 to the base deck 12. The material and thickness of the isolator 102, as well as the methodology used to secure the chassis 50 to the base deck 12, will generally depend upon the mechanical characteristics and performance requirements of a particular disc drive application.

Figure 4:
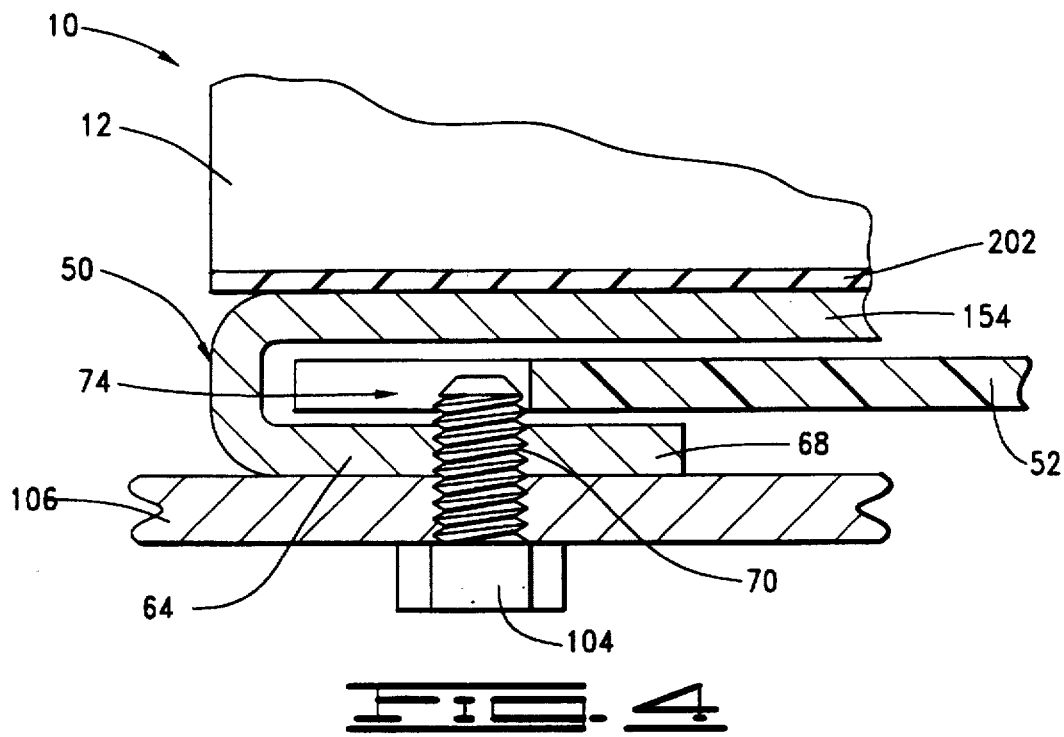
FIG. 4 is a cross-sectional view of the chassis of FIG. 3, illustrating the manner in which the chassis is mounted to a user environment.

Turning now to FIG. 4, shown therein is a cross-sectional view of the chassis 50, illustrating in greater detail the manner in which the chassis 50 is secured to the user environment. More particularly, FIG. 4 shows a threaded fastener 104 which is secured through a base plate 106 of the user environment and the threaded hole 70 of the chassis 50. The threaded end (not designated) of the threaded fastener 104 extends through the notch 74 in the PCB 52. In this manner, the chassis 50 and the isolator 102 operate to isolate the base deck 12 of the disc drive 10 from the user environment.

Having concluded the discussion concerning FIGS. 1–4, attention is now directed to FIG. 5, which shows an isometric, exploded view of an alternative low sway space, two-piece chassis 150 (hereinafter also referred to as "chassis 150") as part of a disc drive 10A. More particularly, the chassis 150 mates with a base deck 12A and a PCB 52A of the disc drive 10A in a manner similar as described hereinabove. It will be noted that the disc drive 10A, base deck 12A and PCB 52A are similar in construction and operation to the corresponding components of FIGS. 1–4, with the exceptions as set forth hereinbelow. Thus, item numbers for corresponding components in FIGS. 1–4 have been used in FIG. 5.

Referring to FIG. 5, the chassis 150 is shown to comprise a pair of inverted F-shaped extrusions (which, alternatively, can be molded or cast parts), each having a vertical rail 152 from which a base deck flange 154 and a printed circuit board flange 156 extend in a generally normal direction. The printed circuit board flanges 156 include tabs 158 which accommodate threaded holes 160 to facilitate mechanical attachment of the chassis 150 to the user environment by way of fasteners (not shown).

The vertical rails 152 align with corresponding inset surfaces (one shown in FIG. 4 at 162) on the side walls 54 of the base deck 12A. Once installed, the vertical rails 152 are secured to the inset surfaces 162 by way of fasteners (not shown) using through holes 164 in the vertical rails 152 and threaded holes 166 in the inset surfaces 162. The preferred alignment of the chassis 150 and the base deck 12A is shown more particularly with reference to FIG. 6.

Referring to FIG. 6, shown therein is an elevational end view of the chassis 150 in conjunction with the disc drive 10A. More particularly, FIG. 6 shows the base deck 12A with the top cover 14, the chassis 150 and the PCB 52A integrally installed to form the disc drive 10A. As with FIG. 3, for purposes of clarity the connector pins 86 of the base deck 12A and the connectors 76, 84 of the PCB 52A have been omitted from FIG. 6.

FIG. 6 shows the base deck flanges 154 to be aligned proximate to the base portion 56 of the base deck 12A. Additionally, FIG. 6 shows the base deck flanges 154 and the printed circuit board flanges 156 to form U-shaped channels which accommodate the PCB 52A.

Disposed between the base deck flanges 154 and the base portion 56 of the base deck 12A are vibro-acoustic isolators 202, which comprise thin layers of damping material substantially conforming to the adjacent surfaces of the base deck flanges 154 and the base portion 56. As with the isolator 102 described above, the isolators 202 are preferably PSA of from about 0.025 to 0.25 millimeters (0.001 to 0.010 inches) in thickness. Additionally, single or double-sided PSA could advantageously be used as the isolators 202 in order to further secure the isolators 202 relative to the chassis 150 and the base deck 12A. It will be recognized, however, that suitable non-adhesive materials could readily be used for the isolators 202.

As with the one-piece chassis 50 described above, in integrating the components shown in FIG. 5 into the assembled disc drive 10A shown in FIG. 6, the PCB 52A is preferably inserted into the slot defined by the two-piece chassis 150 and then the chassis 150 and the PCB 52A are subsequently secured to the base deck 12A.

Figure 7:
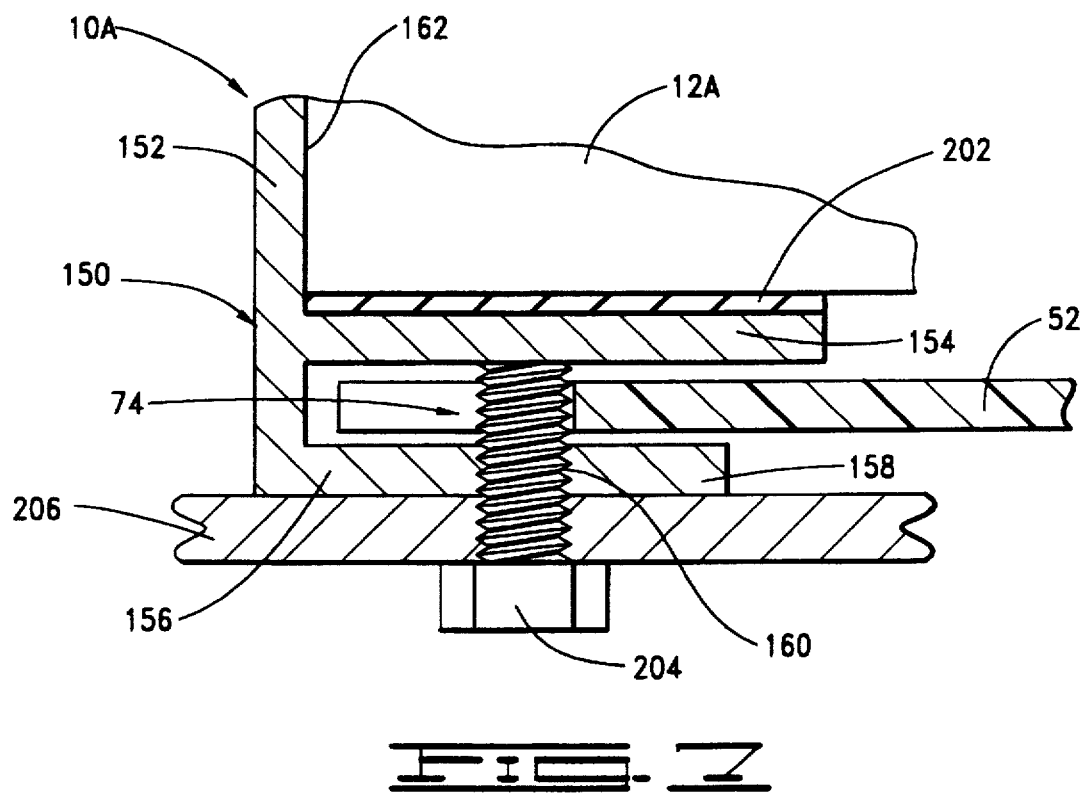
FIG. 7 is a cross-sectional view of the chassis of FIG. 6, illustrating the manner in which the chassis is mounted to a user environment.

Turning now to FIG. 7, shown therein is a cross-sectional view of the chassis 150, illustrating in greater detail the manner in which the chassis 150 is secured to the user environment. As with the one-piece chassis 50 of FIG. 4, the chassis 150 of FIG. 7 is secured by way of a threaded fastener 204 which extends through a base plate 206 of the user environment and through the threaded hole 160 of the chassis 150. As an alternative to the configuration of FIG. 4, the end of the threaded fastener 204 can be made to extend to the base deck flange 154.

The chassis 150 provides additional strength to the base deck 12A and facilitates greater resistance to warpage of the base deck 12A. Additionally, the chassis 150 and the isolators 202 operate to isolate the disc drive 10A from the effects of internal and external vibrations as well as suppress the generation of acoustic noise by the disc drive 10A. Finally, as with the disc drive 10, the chassis 150 and the isolator 202 allow the disc drive 10A to possess a low sway space requirement.

It will be recognized that the disc drive 10 may desirably be mounted using hardware oriented in a direction perpendicular with the side walls 54 of the base deck 12. In such a case, tapped holes (not shown) can readily be provided in the chassis embodiments (50, 150) in locations suitable for such purpose.

It will be clear that the present invention is well adapted to carry out the object and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A low sway space disc drive assembly having a rotatable disc assembly and a controllably positionable actuator adjacent the disc assembly, the actuator including a head for reading and writing data from and to the disc assembly, respectively, the disc drive comprising:

a base deck having a base portion and side walls extending from the base portion, the base portion having an interior surface, an exterior surface, and a cross-sectional thickness, wherein the disc assembly and the actuator are mounted to the interior surface of the base, a top cover engageable with the base deck to form a sealed environment for the disc assembly and the actuator;

a printed circuit board providing control electronics for the disc drive;

a vibro-acoustic isolator abuttingly adjacent the exterior surface of the base portion of the base deck, the vibro-acoustic isolator comprising a layer of damping material having a cross-sectional thickness substantially less than the cross-sectional thickness of the base portion of the base deck; and a chassis supporting the disc drive, the chassis being substantial coextensive with the exterior surface of the base portion of the base deck and vibro-acoustic isolator while abutting the vibro-acoustic isolator, wherein the chassis, the vibro-acoustic isolator and the exterior surface of the base portion of the base deck form a laminate to facilitate constraint layer damping for the disc drive.

2. The disc drive assembly of claim 1, wherein the chassis comprises a C-shaped member comprising a chassis base portion substantially the same shape as the base portion of the base deck and inwardly directed flanges extending from selected edges of the chassis base portion to strengthen the chassis and to accommodate the printed circuit board, and wherein the chassis base portion is proximately aligned with and secured to the base portion of the base deck with the isolator disposed therebetween.

3. The disc drive assembly of claim 1, wherein the chassis comprises a pair of rails, wherein each rail includes a vertical portion aligned with and secured to a selected surface of the side wall of the base deck, a base deck flange extending from the vertical portion and a printed circuit board flange extending from the vertical portion, wherein each base deck flange is proximately aligned with the base portion of the base deck with the isolator disposed therebetween, and wherein a channel is formed between each base deck flange and each printed circuit board flange, the channel strengthening the chassis and accommodating a portion of the printed circuit board.

4. The disc drive assembly of claim 1, wherein the isolator comprises a layer of pressure sensitive adhesive.

5. The disc drive assembly of claim 4, wherein the layer of pressure sensitive adhesive is from 0.025 to 0.25 millimeters (0.001 to 0.010 inches) in thickness.

6. A disc drive, comprising:
   a base deck having sidewalls and a base portion,
   a top cover engageable with the base deck to form an internal sealed environment for the disc drive;
   a printed circuit board housing control electronics for the disc drive;
   an external chassis mounted to the underside of the base portion of the base deck, the chassis comprising:
      a chassis base portion being substantially coextensive with the exterior surface of the base portion and the vibro-acoustic isolator while abutting the vibro-acoustic isolator; and
      attachment means for attaching the chassis to a user environment; and
      a vibro-acoustic isolator disposed between the chassis base portion and the underside of the base portion of the base deck, the vibro-acoustic comprising a layer of damping material, wherein the vibro-acoustic isolator is compressed between the chassis and the base portion to form a laminate facilitating constraint layer damping for the disc drive.

7. The disc drive of claim 6, wherein the chassis further comprises a pair of substantially u-shaped, inwardly directed flanges which, with the chassis base portion, form a substantially C-shaped channel sized to accommodate selected portions of the printed circuit board.

8. The disc drive of claim 6, wherein the vibro-acoustic isolator comprises a layer of pressure sensitive adhesive.

9. A disc drive, comprising:
   a base deck having substantially vertical side walls and a substantially horizontal base portion;
   a top cover engageable with the side walls of the base deck to form an internal sealed environment for the disc drive;
   a printed circuit board housing control electronics for the disc drive;
   a chassis mounted to the exterior of the base deck and substantially coextensive therewith, the chassis comprising:
      a pair of substantially vertical rails aligned with the side walls of the base deck;
      a pair of base deck flanges extending inwardly from the vertical rails, the base deck flanges aligned proximate to the base deck; and
      a pair of printed circuit board flanges extending inwardly from the vertical rails, the printed circuit board flanges and the base deck flanges forming substantially u-shaped channels for strengthening the chassis and accommodating the printed circuit board, the printed circuit board flanges including threaded holes for attachment of the chassis to a user environment; and
   vibro-acoustic isolators disposed between the base deck flanges and the underside of the base portion of the base deck sub substantially coextensive chassis, wherein the vibro-acoustic isolators are compressed between the base deck flanges and the base portion, the vibro-acoustic isolators and the chassis providing for isolation of the disc drive from internal and external vibrations.

10. The disc drive of claim 9, wherein the isolators comprise thin layers of pressure sensitive adhesive.

11. A disc drive, comprising:
   a base deck having a longitudinally extending base portion with a cross-sectional thickness;
   a chassis mounted to the base deck for supporting the disc drive in a user environment, the chassis having a chassis base portion being substantially coextensive with the base portion of the base deck; and
   a vibro-acoustic isolator contactingly disposed between and substantially coextensive with both the chassis base portion and the base portion of the base deck, the chassis abutting the vibro-acoustic isolator, the vibro-acoustic isolator comprising a layer of damping material having length and width dimensions substantially those of the chassis base portion and a cross-sectional thickness substantially less than the cross-sectional thickness of the base portion of the base deck, wherein the chassis base portion, the vibro-acoustic isolator and the base portion of the base deck form a laminate to facilitate constraint layer damping for the disc drive.

12. The disc drive of claim 11, wherein the chassis further comprises:
   flanges depending from the chassis base portion in a direction substantially normal to the base portion of the base deck, the flanges stiffening the chassis and accommodating a printed circuit board of the disc drive.

* * * * *

UNITED STATES PATENT AND TRADEMARK OFFICE
CERTIFICATE OF CORRECTION

PATENT NO. : 5,777,821
DATED : July 7, 1998
INVENTOR(S) : Pottebaum

It is certified that error appears in the above-identified patent and that said Letters Patent is hereby corrected as shown below:

Column 10, line 19, delete "sub substantially" and insert --and abutting a substantially--.

Signed and Sealed this

Eleventh Day of May, 1999

Attest:

Q. TODD DICKINSON

*Attesting Officer*  *Acting Commissioner of Patents and Trademarks*